United States Patent
Suresh et al.

(10) Patent No.: US 11,955,833 B2
(45) Date of Patent: Apr. 9, 2024

(54) INTELLIGENT LOAD CONTROL TO SUPPORT PEAK LOAD DEMANDS IN ELECTRICAL CIRCUITS

(71) Applicant: SCHNEIDER ELECTRIC IT CORPORATION, Foxboro, MA (US)

(72) Inventors: Anil Cheniveettil Suresh, Kerala (IN); Himamshu V Prasad, Tewksbury, MA (US); Chandrasekaran Jayaraman, Bangalore (IN); Pradeep Tolakanahalli Nagabhushanrao, Bangalore (IN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 229 days.

(21) Appl. No.: 17/573,293

(22) Filed: Jan. 11, 2022

(65) Prior Publication Data

US 2022/0224143 A1 Jul. 14, 2022

(30) Foreign Application Priority Data

Jan. 14, 2021 (IN) .............................. 202111001823

(51) Int. Cl.
*H02J 9/06* (2006.01)
*H02J 7/00* (2006.01)

(52) U.S. Cl.
CPC ............ *H02J 9/061* (2013.01); *H02J 7/0068* (2013.01); *H02J 9/068* (2020.01)

(58) Field of Classification Search
CPC .......... H02J 9/061; H02J 7/0068; H02J 9/068; H02J 9/062

(Continued)

(56) References Cited

U.S. PATENT DOCUMENTS

| | | | |
|---|---|---|---|
| 6,201,371 B1* | 3/2001 | Kawabe | H02J 9/062 320/121 |
| 2005/0206241 A1* | 9/2005 | Saxena | H02J 9/06 307/66 |

(Continued)

FOREIGN PATENT DOCUMENTS

| EP | 2804289 A1 | 11/2014 |
|---|---|---|
| JP | H0993784 A | 4/1997 |

(Continued)

OTHER PUBLICATIONS

Extended European Search Report from corresponding European Applictation No. 221513583.3 dated Jun. 9, 2022.

*Primary Examiner* — Richard Tan
(74) *Attorney, Agent, or Firm* — Lando & Anastasi, LLP (57) ABSTRACT

According to aspects of the disclosure, an uninterruptible power supply is provided comprising an input configured to be coupled to, and receive input power from, a circuit breaker, an output configured to be coupled to, and provide output power to, at least one load, an energy-storage-device interface configured to be coupled to, and receive back-up power from, an energy-storage device, and at least one controller configured to determine whether a current through the circuit breaker meets at least one over-current criterion, and control, responsive to determining that the current through the circuit breaker meets the at least one over-current criterion, the uninterruptible power supply to provide the output power to the load, the output power being derived from the input power and the back-up power.

31 Claims, 6 Drawing Sheets

(58) Field of Classification Search
USPC .......................................................... 307/64
See application file for complete search history.

(56) References Cited

U.S. PATENT DOCUMENTS

| | | |
|---|---|---|
| 2006/0028347 A1 | 2/2006 | Ziejewski et al. |
| 2008/0061628 A1 | 3/2008 | Nielsen et al. |
| 2009/0018706 A1* | 1/2009 | Wittner .................... H02J 3/14 |
| | | 706/47 |
| 2011/0044077 A1 | 2/2011 | Nielsen |

FOREIGN PATENT DOCUMENTS

| | | |
|---|---|---|
| JP | 2008148505 A | 6/2008 |
| JP | 2013121205 A | 6/2013 |

\* cited by examiner

FIG. 6

INTELLIGENT LOAD CONTROL TO SUPPORT PEAK LOAD DEMANDS IN ELECTRICAL CIRCUITS

CROSS-REFERENCE TO RELATED APPLICATIONS

This application claims priority under 35 U.S.C. § 119 to Indian Application Serial No. 2021/11001823 titled "INTELLIGENT LOAD CONTROL TO SUPPORT PEAK LOAD DEMANDS IN ELECTRICAL CIRCUITS," filed on Jan. 14, 2021, which is hereby incorporated by reference in its entirety.

BACKGROUND

1. Field of the Disclosure

At least one example in accordance with the present disclosure relates generally to uninterruptible power supplies.

2. Discussion of Related Art

Power devices, such as uninterruptible power supplies (UPSs), may be used to provide regulated, uninterrupted power for sensitive and/or critical loads, such as computer systems and other data processing systems. Existing UPSs include online UPSs, offline UPSs, line-interactive UPSs, as well as others. Online UPSs provide conditioned AC power as well as back-up AC power upon interruption of a primary source of AC power. Offline UPSs typically do not provide conditioning of input AC power but do provide back-up AC power upon interruption of the primary AC power source.

SUMMARY

According to at least one aspect of the present disclosure, an uninterruptible power supply (UPS) is provided comprising an input configured to be coupled to, and receive input power from, a circuit breaker, an output configured to be coupled to, and provide output power to, at least one load, an energy-storage-device interface configured to be coupled to, and receive back-up power from, an energy-storage device, and at least one controller configured to determine whether a current through the circuit breaker meets at least one over-current criterion, and control, responsive to determining that the current through the circuit breaker meets the at least one over-current criterion, the uninterruptible power supply to provide the output power to the load, the output power being derived from the input power and the back-up power.

In some examples, the at least one over-current criterion includes a current threshold, and determining whether the current through the circuit breaker meets the at least one over-current criterion includes determining whether the current through the circuit breaker meets the current threshold. In at least one example, the current threshold is a current rating of the circuit breaker. In various examples, the UPS includes at least one power converter coupled to the energy-storage-device interface, and the at least one controller is further configured to determine, responsive to determining that the current through the circuit breaker meets or exceeds the current threshold, a current difference between an output current to be provided to the at least one load and an input current drawn from the circuit breaker, and control the at least one power converter to draw back-up current from the energy-storage-device interface based on the current difference.

In some examples, the UPS includes at least one power converter coupled to the circuit breaker and configured to draw an input current from the circuit breaker, and the at least one controller is further configured to control the at least one power converter to limit the input current such that the current through the circuit breaker does not exceed the current threshold. In at least one example, the at least one controller is communicatively coupled to at least one current sensor coupled in series with the circuit breaker, and the at least one controller is configured to receive current information indicative of the current through the circuit breaker from the at least one current sensor. In various examples, the UPS is coupled in parallel with one or more loads each coupled to a respective disconnection switch of one or more disconnection switches, and the at least one controller is communicatively coupled to each disconnection switch of the one or more disconnection switches.

In some examples, the one or more loads includes a first external load coupled to a first disconnection switch, and the at least one controller is configured to control, responsive to determining that the current through the circuit breaker meets the over-current criterion, the first disconnection switch to cause the first external load to draw less current from the circuit breaker. In at least one example, the one or more loads are ranked from a lowest-priority load to a highest-priority load, and the at least one controller is configured to control, responsive to determining that the current through the circuit breaker meets the over-current criterion, a respective disconnection switch coupled to the lowest-priority load to cause the lowest-priority load to draw less current from the circuit breaker.

In various examples, the at least one controller is configured to control, responsive to determining that the current through the circuit breaker meets the over-current criterion subsequent to controlling the respective disconnection switch coupled to the lowest-priority load to cause the lowest-priority load to draw less current from the circuit breaker, a respective disconnection switch coupled to a second-lowest-priority load to cause the second-lowest-priority load to draw less current from the circuit breaker. In some examples, the UPS includes at least one power converter coupled to the energy-storage-device interface, and the at least one controller is further configured to control, responsive to determining that the current through the circuit breaker does not meet the over-current criterion, the at least one power converter to provide a charging current derived from the input power to the energy-storage device.

In at least one example, the UPS includes at least one power converter coupled to the energy-storage-device interface, and the at least one controller is further configured to control, responsive to determining that the input power is not available from the circuit breaker, the at least one power converter to provide the output power from the energy-storage device to the output. In various examples, the at least one controller is further configured to determine that the current through the circuit breaker does not meet the at least one over-current criterion, control the UPS to be in a standby mode of operation responsive to determining that the current through the circuit breaker does not meet the at least one over-current criterion, and monitor the input power during the standby mode of operation.

In some examples, the at least one controller is further configured to determine, during the standby mode of operation, that the input power is not acceptable, control the UPS to be in a back-up mode of operation responsive to determining that the input power is not acceptable, and control the uninterruptible power supply to provide the output power to the load in the back-up mode of operation, the output power being derived from the back-up power. In at least one example, controlling the uninterruptible power supply to provide output power derived from the back-up power to the load prevents a voltage drop of the output power. In various examples, the UPS includes a housing configured to house the input, the output, the energy-storage-device interface, and the at least one controller, and wherein the circuit breaker is external to the housing.

In some examples, the circuit breaker is a main circuit breaker configured to provide a first portion of the current through the circuit breaker to the input and a second portion of the current through the circuit breaker to at least one branch circuit breaker, and the at least one controller is further configured to determine whether a current through the branch circuit breaker meets at least one second over-current criterion, and control, responsive to determining that the current through the branch circuit breaker meets the at least one second over-current criterion, the uninterruptible power supply to provide the output power to the load, the output power being derived from the input power and the back-up power. In at least one example, the at least one second over-current criterion includes a current threshold, and determining whether the current through the branch circuit breaker meets the at least one second over-current criterion includes determining whether the current through the branch circuit breaker meets the current threshold. In various examples, the current threshold is a current rating of the branch circuit breaker.

According to an example of the disclosure, a non-transitory computer-readable medium storing thereon sequences of computer-executable instructions for controlling an uninterruptible power supply (UPS) having an input coupled to and configured to receive input power from a circuit breaker, an output coupled to and configured to provide output power to a load, and an energy-storage-device interface coupled to and configured to receive back-up power from an energy-storage device is provided, the sequences of computer-executable instructions including instructions that instruct at least one processor to determine whether a current through the circuit breaker meets at least one over-current criterion, and control, responsive to determining that the current through the circuit breaker meets the at least one over-current criterion, the uninterruptible power supply to provide the output power to the load, the output power being derived from the input power and the back-up power.

In some examples, the at least one over-current criterion includes a current threshold, and determining whether the current through the circuit breaker meets the at least one over-current criterion includes determining whether the current through the circuit breaker meets the current threshold. In at least one example, the UPS further includes at least one power converter coupled to the energy-storage-device interface, and the instructions further instruct the at least one processor to determine, responsive to determining that the current through the circuit breaker meets or exceeds the current threshold, a current difference between an output current to be provided to the at least one load and an input current drawn from the circuit breaker, and control the at least one power converter to draw back-up current from the energy-storage-device interface based on the current difference.

In various examples, the UPS further includes at least one power converter coupled to the circuit breaker and configured to draw an input current from the circuit breaker, and the instructions further instruct the at least one processor to control the at least one power converter to limit the input current such that the current through the circuit breaker does not exceed the current threshold. In some examples, the current threshold is a current rating of the circuit breaker. In at least one example, the UPS is coupled in parallel with one or more loads including a first external load coupled to a first disconnection switch, and the instructions further instruct the at least one processor to control, responsive to determining that the current through the circuit breaker meets the over-current criterion, the first disconnection switch to cause the first external load to draw less current from the circuit breaker.

In various examples, the one or more loads are ranked from a lowest-priority load to a highest-priority load, and the instructions further instruct the at least one processor to control, responsive to determining that the current through the circuit breaker meets the over-current criterion, a respective disconnection switch coupled to the lowest-priority load to cause the lowest-priority load to draw less current from the circuit breaker. In some examples, the instructions further instruct the at least one processor to determine that the current through the circuit breaker does not meet the at least one over-current criterion, control the UPS to be in a standby mode of operation responsive to determining that the current through the circuit breaker does not meet the at least one over-current criterion, and monitor the input power during the standby mode of operation.

In at least one example, the instructions further instruct the at least one processor to determine, during the standby mode of operation, that the input power is not acceptable, control the UPS to be in a back-up mode of operation responsive to determining that the input power is not acceptable, and control the uninterruptible power supply to provide the output power to the load in the back-up mode of operation, the output power being derived from the back-up power. In various examples, controlling the uninterruptible power supply to provide output power derived from the back-up power to the load prevents a voltage drop of the output power.

In some examples, the circuit breaker is a main circuit breaker configured to provide a first portion of the current through the circuit breaker to the input and a second portion of the current through the circuit breaker to at least one branch circuit breaker, and the instructions further instruct the at least one processor to determine whether a current through the branch circuit breaker meets at least one second over-current criterion, and control, responsive to determining that the current through the branch circuit breaker meets the at least one second over-current criterion, the uninterruptible power supply to provide the output power to the load, the output power being derived from the input power and the back-up power. In at least one example, the at least one second over-current criterion includes a current threshold, and determining whether the current through the branch circuit breaker meets the at least one second over-current criterion includes determining whether the current through the branch circuit breaker meets the current threshold. In various examples, the current threshold is a current rating of the branch circuit breaker.

According to at least one aspect of the disclosure, an uninterruptible power supply is provided comprising an input configured to be coupled to, and receive input power from, a circuit breaker, an output configured to be coupled to, and provide output power to, at least one load, an energy-storage-device interface configured to be coupled to, and receive back-up power from, an energy-storage device, and means for maintaining a current through the circuit breaker below a current threshold of the circuit breaker.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Circuit breakers prevent excessive current from passing through electrical components. For example, circuit breakers may have a "current rating" indicating a maximum current that the circuit breaker will conduct. If a current through the circuit breaker exceeds the current rating, the circuit breaker interrupts the current. For example, the circuit breaker may open a relay to interrupt the current and thereby prevent excessive current from passing through (and, in some instances, damaging) electrical components. Circuit breakers may thus protect electrical components from overcurrent events.

Although circuit breakers may be effective in preventing excessive current through electrical components, interrupting power to the electrical components may render the electrical components (or "loads") unusable while power is unavailable. Such load drops may undesirably inconvenience users. Although some loads may be coupled to an uninterruptible power supply (UPS) capable of providing uninterrupted power to a connected load while mains power from a circuit breaker is unavailable, loads that are not connected to a UPS (referred to herein as "unconnected loads") may not have access to uninterruptible power.

Figure 1:
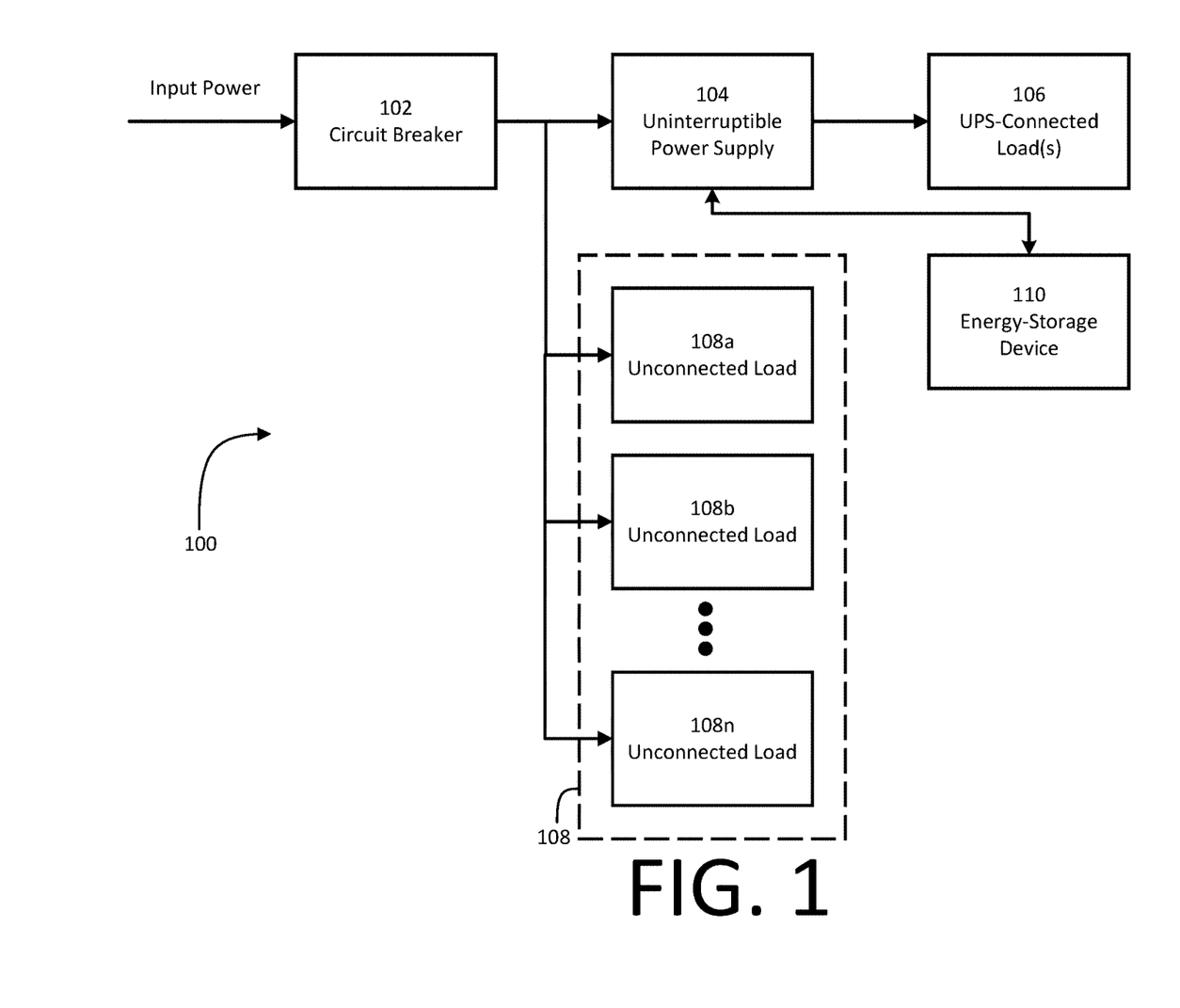
FIG. 1 illustrates a block diagram of a power system.

FIG. 1 illustrates a block diagram of a power system 100. The power system 100 includes a circuit breaker 102, a UPS 104, one or more UPS-connected loads 106 ("connected loads 106"), an arbitrary number of unconnected loads 108, and an energy-storage device 110. The connected loads 106 and unconnected loads 108 may include any type of device configured to operate in connection with electrical power, such as residential loads (for example, dishwashers, drying machines, washing machines, blenders, toasters, ovens, lights, and so forth), commercial or industrial loads (for example, lights, copy machines, telephones, manufacturing equipment, and so forth), or other types of loads. The circuit breaker 102, connected upstream from the loads 106, 108, may be configured to prevent an excessive current from passing through the loads 106, 108.

The circuit breaker 102 is coupled to the UPS 104 and the unconnected loads 108 at an output, and is configured to be coupled to a source of input power (for example, a mains power supply) at an input. The UPS 104 is coupled to the circuit breaker 102 at a mains input, is coupled to the connected loads 106 at an output, and is coupled to the energy-storage device 110 at a backup-power input. The connected loads 106 are coupled to the UPS 104 and may, depending on a type of a respective load, be coupled to one or more additional components. The unconnected loads 108 are coupled to the circuit breaker 102 and may, depending on a type of a respective load, be coupled to one or more additional components. The energy-storage device 110 is coupled to the UPS 104.

Input current received by the circuit breaker 102 is provided to the UPS 104 and the unconnected loads 108. The UPS 104 may provide power to the connected loads 106. If the input current is below a current rating of the circuit breaker 102, the circuit breaker 102 allows current to pass to the UPS 104 and to the unconnected loads 108. If the input current is equal to or above a current rating of the circuit breaker 102, the circuit breaker 102 may "trip" and interrupt current to the UPS 104 and unconnected loads 108, such as by opening a relay. As appreciated by one of ordinary skill in the art, certain circuit breakers may trip only if a current in excess of the current rating passes through the circuit breaker for more than a threshold amount of time, which may vary depending on a current level.

Although the circuit breaker 102 may advantageously prevent excessive current from passing through the loads 106, 108, the unconnected loads 108 may no longer be operational without power from the circuit breaker 102. The UPS 104 may continue to provide power derived from the energy-storage device 110 to the connected loads 106, but if the energy-storage device 110 is depleted of stored energy before mains power is again available from the circuit breaker 102, the UPS 104 may cease providing power to the connected loads 106. The connected loads 106 may no longer be operational without power from the UPS 104.

In light of the foregoing, although circuit breakers may be effective in preventing excessive current through electrical components, interrupting current to the electrical components may disadvantageously render the electrical components inoperable while power is unavailable. Examples of the disclosure therefore provide a UPS capable of reducing a current drawn from a circuit breaker such that a current rating of the circuit breaker is not exceeded. In one example, a UPS determines whether a current through a circuit breaker meets one or more over-current criteria (for example, by exceeding, or being close to exceeding, a current rating of the circuit breaker). If the criteria are met, the UPS may reduce an amount of mains power drawn from the circuit breaker and draw backup power from an energy-storage device to compensate for the reduced mains power. Accordingly, the UPS may avoid tripping the circuit breaker without reducing power supplied to a connected load.

Current power systems implementing circuit breakers may drop loads when the circuit breaker is tripped. Such power systems may operate inefficiently, because load drops reduce an uptime of the loads. This is a technical problem. An exemplary embodiment of a power system provides an uninterruptible power supply comprising an input configured to be coupled to, and receive input power from, a circuit breaker, an output configured to be coupled to, and provide output power to, at least one load, an energy-storage-device interface configured to be coupled to, and receive back-up power from, an energy-storage device, and at least one controller configured to determine whether a current through the circuit breaker meets at least one over-current criterion, and control, responsive to determining that the current through the circuit breaker meets the at least one over-current criterion, the uninterruptible power supply to provide the output power to the load, the output power being derived from the input power and the back-up power.

At least this foregoing combination of features comprises a power system that serves as a technical solution to the foregoing technical problem. This technical solution is not routine and is unconventional. This technical solution is a practical application of the power system design that solves the foregoing technical problem and constitutes an improvement in the technical field of power supply at least by increasing load uptime without compromising circuit-breaker operation.

Figure 2:
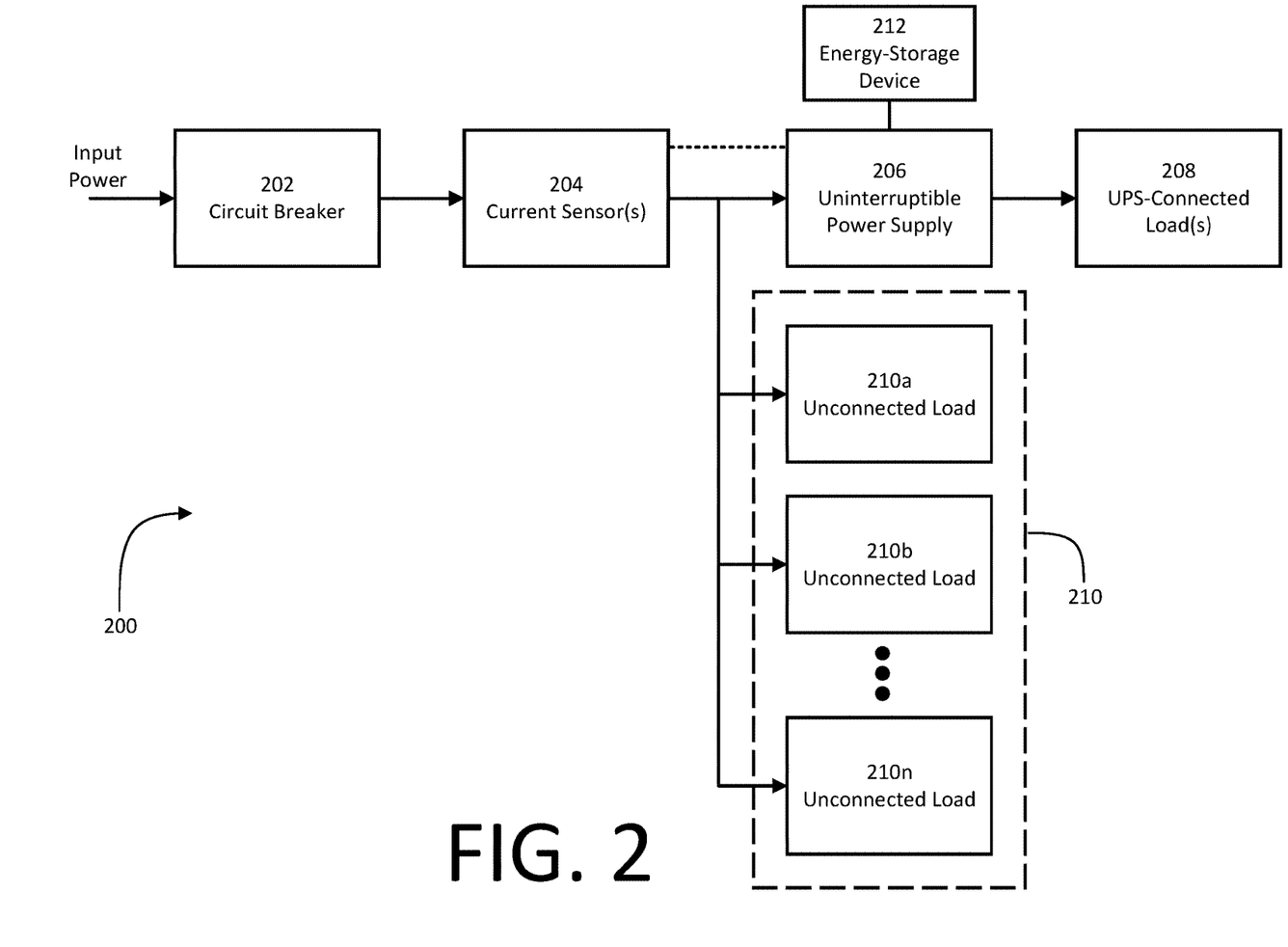
FIG. 2 illustrates a block diagram of a power system according to an example.

FIG. 2 illustrates a block diagram of a power system 200 according to an example. The power system 200 includes a circuit breaker 202, one or more current sensor(s) 204 ("current sensor 204"), a UPS 206, one or more UPS-connected loads 208 ("connected loads 208"), and one or more unconnected loads 210, and at least one energy-storage device 212 ("energy-storage device 212"). In various examples, the circuit breaker 202, connected loads 208, unconnected loads 210, and energy-storage device 212 may be substantially similar or identical to the circuit breaker 102, connected loads 106, unconnected loads 108, and energy-storage device 110, respectively.

The circuit breaker 202 is coupled to the current sensor 204 at an output, and is configured to be coupled to, and receive input power from, a mains power supply at an input. The current sensor 204 is coupled to the circuit breaker 202 at an input, is coupled to the UPS 206 and unconnected loads 210 at an output, and is communicatively coupled to the UPS 206 via a wired or wireless communication link. The UPS 206 is coupled to the circuit breaker 202 at a mains input, is coupled to the energy-storage device 212 at a backup-power input, is coupled to the connected loads 208 at an output, and is communicatively coupled to the current sensor 204.

The connected loads 208 are coupled to the UPS 206 and may, depending on a type of a respective load, be coupled to one or more additional components. The unconnected loads 210 are coupled to the current sensor 204 and may, depending on a type of a respective load, be coupled to one or more additional components. The energy-storage device 212 is coupled to the UPS 206.

As discussed in greater detail below, the UPS 206 is configured to determine a current through the circuit breaker 202. If the UPS 206 determines that the current through the circuit breaker 202 meets one or more over-current criteria, the UPS 206 may reduce, or limit, an amount of current that the UPS 206 draws from the circuit breaker 202. For example, the one or more over-current criteria may indicate that the circuit breaker 202 is at risk of being tripped, which the UPS 206 may be configured to address. To avoid reducing an amount of power provided by the UPS 206 to the connected loads 208, the UPS 208 may draw power from the energy-storage device 212 that would otherwise be drawn from the circuit breaker 202.

Figure 3:
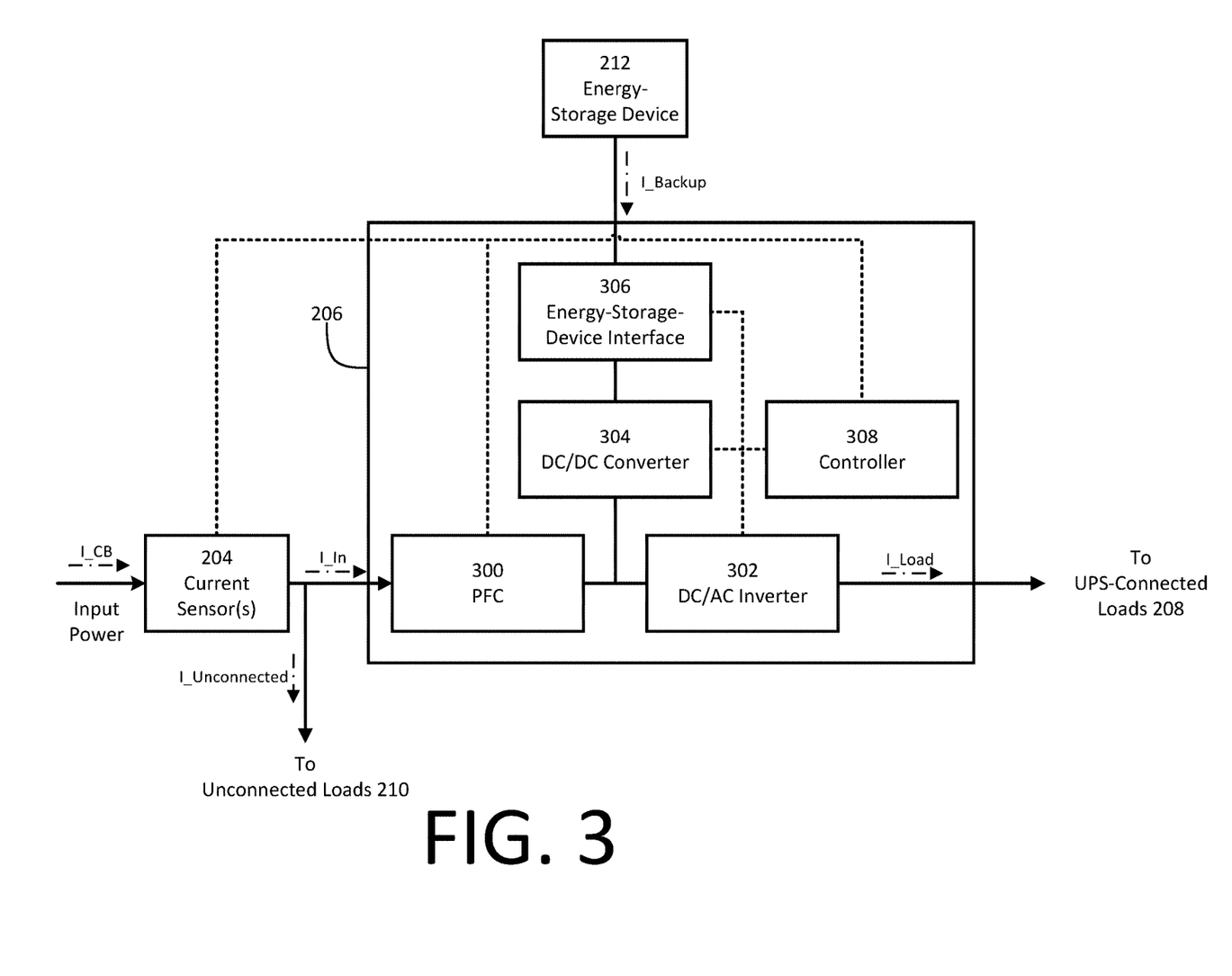
FIG. 3 illustrates a block diagram of a portion of the power system of FIG. 2 according to an example.

FIG. 3 illustrates a block diagram of a portion of the power system 200 including the current sensor 204, the UPS 206, the unconnected loads 208, and the energy-storage device 212. The UPS 206 includes a power-factor-correction circuit (PFC) 300, a DC/AC inverter 302, a DC/DC converter 304, an energy-storage-device interface 306, and a controller 308. It is to be appreciated that FIG. 3 provides only one example of components of the UPS 206, and that alternate implementations of the UPS 206 are within the scope of the disclosure. Furthermore, it is to be appreciated that components of the UPS 206 may be omitted for purposes of clarity.

The PFC 300 is coupled to the current sensor 204 at an input and is coupled to the DC/AC inverter 302 and the DC/DC converter 304 at an output. The PFC 300 is configured to receive an input current I_in from the current sensor 204. The PFC 300 is also communicatively coupled to the controller 308.

The DC/DC converter 304 is coupled to the PFC 300 and the DC/AC inverter 302 at a first connection, and is coupled to the energy-storage-device interface 306 at a second connection. The DC/DC converter 304 is also communicatively coupled to the controller 308. The energy-storage-device interface 306 is coupled to, and is configured to receive a backup current I_backup from, the DC/DC converter 304 at a first connection, and is configured to be coupled to the energy-storage device 212 at a second connection. For example, the energy-storage-device interface 306 may be or include one or more ports, terminals, or other connectors to couple to, and exchange power with, the energy-storage device 212. In some examples, the energy-storage-device interface 306 is also coupled to the controller 308. The DC/AC inverter 302 is coupled to the PFC 300 and the DC/DC converter 304 at an input, and is coupled to, and is configured to provide a load current I_load to, the connected loads 208. In various examples, the load current I_load is derived from one or both of the backup current I_backup or the input current I_in pursuant to Equation (1):

$$I_{load} \approx f(I_{in}) + f(I_{backup})$$

In Equation (1), $f(I_{in})$ is a function of the input current I_in and $f(I_{backup})$ is a function of the backup current I_backup. In various examples, the energy delivered to a load by the UPS 100 is derived from the energy received at the PFC 300 and the energy received at the energy-storage-device interface 306. As appreciated by one of ordinary skill in the art, the load current I_load may not be precisely equal to a sum of the backup current I_backup and the input current I_in where, for example, the input current I_in and/or the load current I_load are a first type of current (for example, AC current) and the backup current I_backup is a second type of current (for example, DC current). Furthermore, as discussed herein, energy provided by at least a portion of the input current I_in and/or backup current I_backup may be utilized by the UPS 100 itself (for example, in connection with a logic power supply), lost as heat, and so forth. Accordingly, while the load current I_load may be determined as a function of the input current I_in and a function of the backup current I_backup, the load current I_load may not be precisely equal to a sum of the input current I_in and the backup current I_backup.

The DC/AC inverter 302 is also communicatively coupled to the controller 308. The controller 308 is communicatively coupled to the current sensor 204, PFC 300, the DC/AC inverter 302, the DC/DC converter 304, and the energy-storage-device interface 306.

The current sensor 204 is coupled to, and is configured to receive a circuit-breaker current I_CB from, the circuit breaker 202 at an input, and is coupled to the PFC 300 and the unconnected loads 210 at an output. The current sensor 202 is also communicatively coupled to the controller 308. The current sensor 202 is configured to provide the input current I_in to the PFC 300 and is configured to provide an unconnected-load current I_unconnected to the unconnected loads 210. In some examples, the input current I_in and the unconnected-load current I_unconnected are derived from the circuit-breaker current I_CB pursuant to Equation (2):

$$I_{CB} \approx I_{in} + I_{unconnected}$$

As discussed above, the circuit breaker 202 may be configured to discontinue providing the circuit-breaker current I_CB if the circuit-breaker current I_CB meets or exceeds a current rating of the circuit breaker 202. The UPS 206 (and, more particularly, the controller 308) receives information indicative of the circuit-breaker current I_CB from the current sensor 204. In various examples, the UPS 206 may reduce or limit the input current I_in drawn from the circuit breaker 202 if, for example, information indicates that the circuit-breaker current I_CB is approaching or exceeding the current rating, as defined by one or more over-current criteria. Pursuant to Equation (2), reducing or limiting the input current I_in may also reduce or limit the circuit-breaker current I_CB such that the circuit-breaker current I_CB does not meet or exceed the current rating.

To maintain a constant load current I_load while reducing or limiting the input current I_in, pursuant to Equation (1), the backup current I_backup may be increased to compensate for current that would otherwise be drawn from the circuit breaker 202 absent the reducing or limiting. Accordingly, the UPS 206 may avoid tripping the circuit breaker 202 without adversely impacting the load current I_load provided to the connected loads 208. Operation of the UPS 206 is discussed in greater detail below with respect to FIG. 4.

Figure 4:
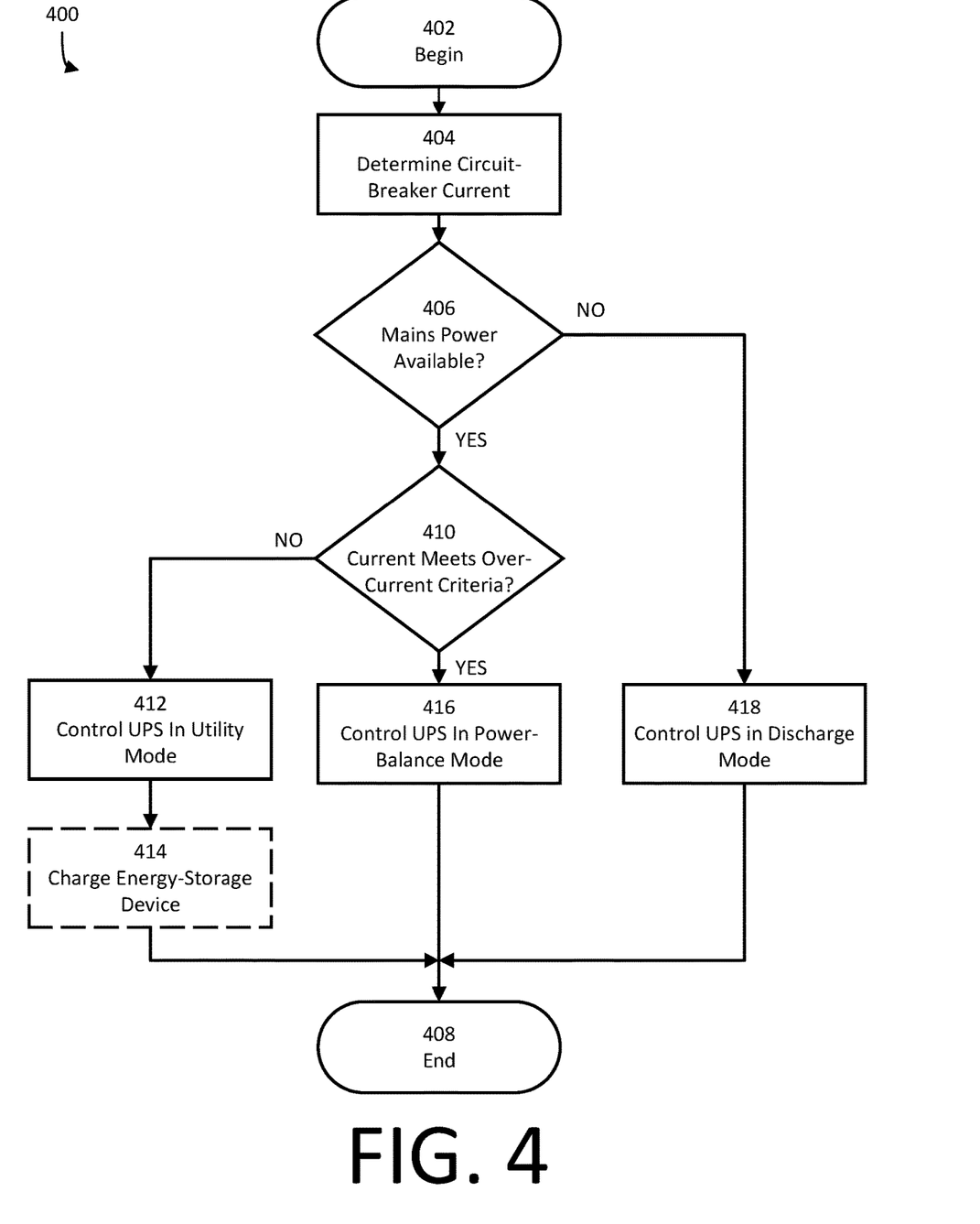
FIG. 4 illustrates a process of controlling an uninterruptible power supply according to an example.

FIG. 4 illustrates a process 400 of operating the UPS 206 according to an example. The process 400 may be executed by the UPS 206. For example, the process 400 may be executed by the controller 308. The process 400 may be executed while the UPS 206 is operational, that is, powered on. In various examples, the process 400 may be repeatedly executed (for example, periodically, aperiodically, continuously, and so forth) during operation of the UPS 206.

At act 402, the process 400 begins.

At act 404, a circuit-breaker current is determined. For example, the current sensor 204 may sense the circuit-breaker current I_CB and provide information indicative of the circuit-breaker current I_CB to the controller 308.

At act 406, a determination is made as to whether mains power is available to the UPS 206. For example, the controller 308 may determine if mains power is available. In one example, the controller 308 determines whether mains power is available by determining whether the circuit-breaker current I_CB, which is derived from mains power, has an acceptable value and/or is within an acceptable range. In another example, the UPS 206 may determine whether mains power is available based on additional or different information. For example, the UPS 206 may include or be coupled to one or more voltage sensors configured to provide voltage information to the UPS 206, and the UPS 206 may determine whether the voltage is acceptable (for example, by having a value within an acceptable range of voltage values). In other examples, other methods of determining whether mains power is available may be implemented. If mains power is not available (406 NO), then the process 400 continues to act 418.

At act 418, the controller 308 controls the UPS 206 to operate in a discharge mode. In the discharge mode, the UPS 206 is configured to provide output power derived from the energy-storage device 212 to the connected loads 208. Because mains power is unavailable, the input current I_in may be substantially zero and, pursuant to Equation (1), the load current I_load may be supplied substantially entirely by the backup current I_backup. More particularly, the controller 308 may control the DC/DC converter 304 to draw the backup current I_backup from the energy-storage device 212 via the energy-storage-device interface 306. The DC/DC converter 304 may convert the DC power received from the energy-storage device 212 (for example, by stepping up or down the voltage of the DC power) and provide the converted DC power to the DC/AC inverter 302. The DC/AC inverter 302 converts the converted DC power to AC power and provides the AC power (and the load current I_load) to the connected loads 208. The controller 308 may control the UPS 206 to provide output power derived from the energy-storage device 212 to the connected loads 208 until mains power is restored or the energy-storage device 212 is depleted below a threshold state of charge, for example.

At act 408, the process 400 ends. However, it is to be appreciated that the process 400 may be re-executed immediately after act 408, or after a delay.

Returning to act 406, if mains power is available (406 YES), then the process 400 continues to act 410. At act 410, the controller 308 determines whether the circuit-breaker current I_CB meets one or more over-current criteria. The over-current criteria may indicate a condition under which the circuit breaker 202 is at a risk of tripping, which the UPS 206 may attempt to avoid.

In various examples, an over-current criterion may be based on a current rating of the circuit breaker 202. For example, an over-current criterion may be satisfied if the circuit-breaker current I_CB is equal to or greater than the current rating at all, or for more than a threshold amount of time. In another example, an over-current criterion may be satisfied if the circuit-breaker current I_CB is less than the current rating but within a threshold amount of the current rating (for example, within 10% of the current rating, within 1.5% of the current rating, within 1 A of the current rating, within 0.5 A of the current rating, and so forth). In some examples, the one or more over-current criteria may include a current-magnitude criterion and a current-duration criterion. For example, the one or more over-current criteria may not be satisfied until a current exceeds a threshold amount for a threshold amount of time. In still other examples, other over-current criteria may be implemented.

If the controller 308 determines that the one or more over-current criteria are not met (410 NO), then the process 400 continues to act 412. At act 412, the controller 308 controls the UPS 206 to operate in a utility mode (also referred to herein as a "normal" or "standby" mode). In one example of the utility mode, the controller 308 may determine that the circuit breaker 202 is not at imminent risk of being tripped, and that the UPS 206 thus need not draw power from the energy-storage device 212 to limit an amount of current drawn from the circuit breaker 202. Accordingly, in one example of the utility mode, the backup current I_backup may be substantially zero and, pursuant to Equation (1), the input current I_in drawn from the circuit breaker 202 may be substantially equal to the load current I_load or a function of the load current.

In one example of the utility mode, the controller 308 may control the PFC 300 to draw AC power from the circuit breaker 202. The PFC 200 performs power-factor correction on the DC power and provides the corrected DC power to the DC/AC inverter 302. The DC/AC inverter 302 converts the corrected DC power to AC power and provides the AC power to the connected loads 208.

At optional act 412, the controller 308 may control the UPS 206 to charge the energy-storage device 212 using mains power derived from the circuit breaker 202. For example, the controller 308 may control the UPS 206 to charge the energy-storage device 212 if the energy-storage device 212 has below a threshold amount of charge (for example, below 99% charge, below 95% charge, below 80% charge, and so forth). If a state of charge of the energy-storage device 212 is not below the threshold amount, then optional act 412 may not be executed. In various examples, the controller 308 may not control the UPS 206 to charge the energy-storage device 212 if the charging current would cause the one or more over-current criteria to be met at act 410. In other examples, optional act 412 is not executed, and the UPS 206 does not charge the energy-storage device 212.

At act 408, the process 400 ends. However, it is to be appreciated that the process 400 may be re-executed immediately after act 408, or after a delay.

Returning to act 410, if the controller 308 determines that the circuit-breaker current I_CB meets the one or more over-current criteria (410 YES), then the process 400 continues to act 416. At act 416, the controller 308 controls the UPS 206 to operate in a power-balance mode. In one example of the power-balance mode, the controller 308 may determine that the circuit breaker 202 is at risk of being tripped by virtue of the one or more over-current criteria being met (410 YES). Accordingly, the controller 308 may control the UPS 206 such that at least a portion of the load current I_load is derived from the backup current I_backup. As discussed above, if the load current I_load is held constant while increasing the backup current I_backup, the input current I_in (and, consequently, the circuit-breaker current I_CB) may be reduced.

In various examples, the power-balance mode may include adjusting the load current I_load and the backup current I_backup to maintain the circuit-breaker current I_CB at or below a current threshold in some examples. For example, the current threshold may be equal to a current rating of the circuit breaker 202 or a portion thereof, such as 90% of the current rating. If the circuit-breaker current I_CB exceeds the current threshold, the controller 308 may control the UPS 206 to reduce the input current I_in such that the circuit-breaker current I_CB is reduced below the current threshold. For example, the unconnected loads 210 may draw additional current which, pursuant to Equation (2), may increase the circuit-breaker current I_CB. Similarly, if the controller 308 determines that additional load power is desired from the connected loads 208, but that drawing additional power from the circuit breaker 202 would increase the input current I_in above the current threshold, the controller 308 may instead draw the additional power from the energy-storage device 212 by increasing the backup current I_backup drawn. In some examples, the controller 308 may determine a difference between an output current to be provided by the circuit breaker 202 and the current threshold, and control the UPS 206 to draw the difference from the energy-storage device 212. Accordingly, the controller 308 may modulate the amount of backup current I_backup drawn from the energy-storage device 212 to maintain the circuit-breaker current I_CB at or below a current threshold.

In one example of the power-balance mode, the controller 308 controls the PFC 300 to draw AC power from the circuit breaker 202 in substantially the same manner as discussed above with respect to the utility mode, and controls the DC/DC converter 304 to draw DC power from the energy-storage device 212 in substantially the same manner as discussed above with respect to the discharge mode. The controller 308 controls the DC/AC inverter 302 to receive DC power from the PFC 300 and from the DC/DC converter 304, convert the received DC power to AC power, and provide the AC power to the connected loads 208.

The controller 308 may control the PFC 300 to reduce or limit the input current I_in in conjunction with controlling the DC/DC converter 304 to draw DC power from the energy-storage device 212 such that a current and/or voltage to the connected loads 208 is not substantially affected (for example, by avoiding a current or voltage drop or spike). For example, the controller 308 may control the PFC 300 to reduce an amount of current drawn from the circuit breaker 202 at a first rate and control the DC/DC converter 304 to increase an amount of current drawn from the energy-storage device 212 at a second rate, where the first rate and the second rate have a substantially equal magnitude.

At act 408, the process 400 ends. However, it is to be appreciated that the process 400 may be re-executed immediately after act 408, or after a delay.

Accordingly, in some examples the UPS 206 is configured to modulate the circuit-breaker current I_CB pursuant to Equation (2) at least in part by modulating the input current I_in, without affecting the load current I_load. That is, a current through the circuit breaker 202 may be limited or reduced at least in part by limiting or reducing a current drawn by the UPS 206, and instead drawing at least a portion of the load current I_load from the energy-storage device 212. Power to the connected loads 208 and to the unconnected loads 210 may therefore be uninterrupted without exceeding a current rating of the circuit breaker 202. In additional examples, the UPS 206 may alternately or additionally be configured to control a current through the unconnected loads 210 to avoid tripping the circuit breaker 202.

Figure 5:
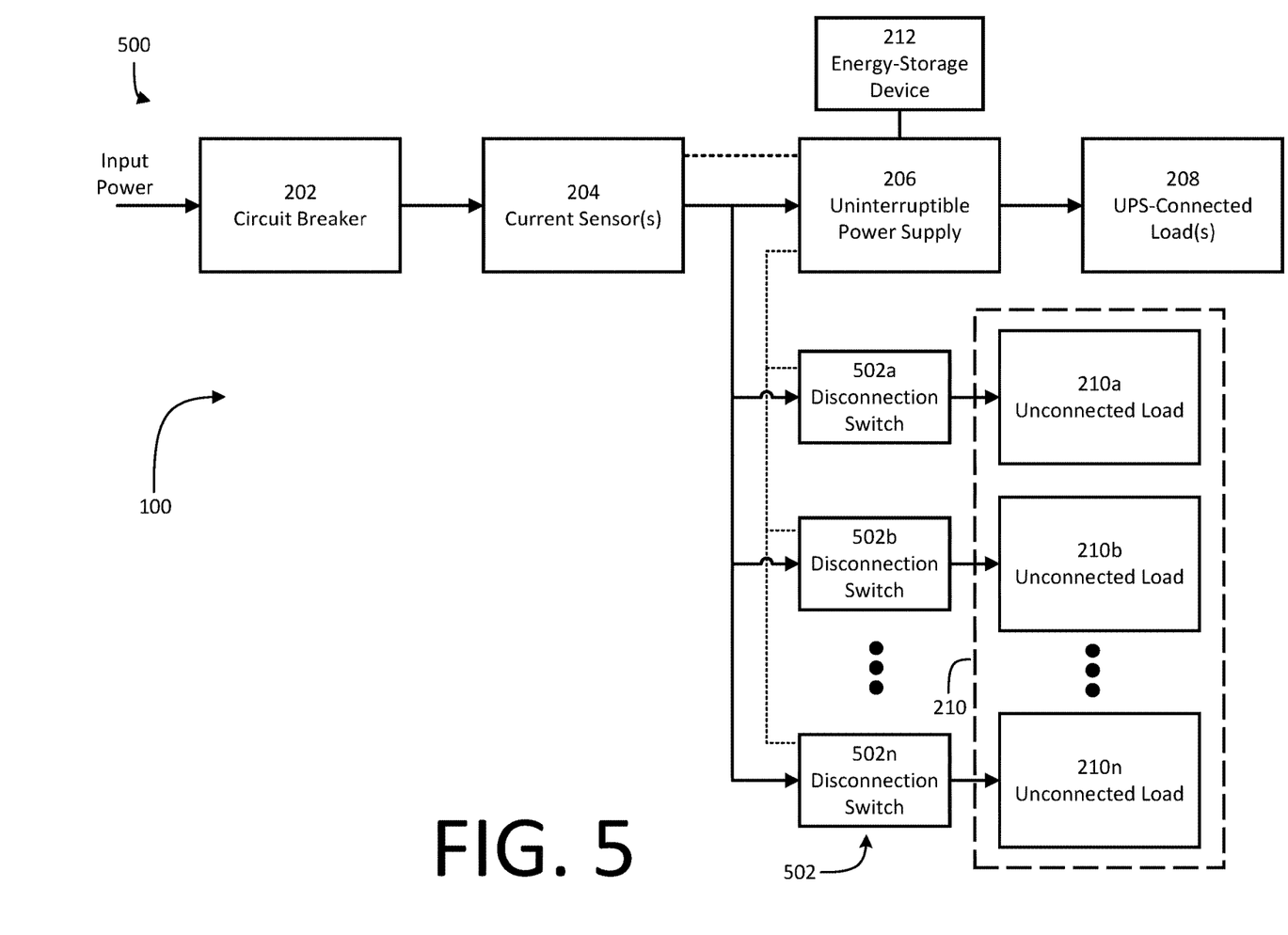
FIG. 5 illustrates a block diagram of a power system according to another example.

For example, FIG. 5 illustrates a block diagram of a power system 500 according to an example. The power system 500 is substantially similar to the power system 200, and like components are labelled accordingly. In addition, the power system 500 includes a plurality of disconnection switches 502, each coupled to a respective one of the unconnected loads 210. Each of the disconnection switches 502 is configured to be communicatively coupled to the UPS 206 through a wired or wireless connection (for example, via the controller 308). In some examples, each of the unconnected loads 210 may include a respective disconnection switch of the disconnection switches 502, and each of the unconnected loads 210 may be communicatively coupled to the UPS 206 (for example, via the controller 308). That is, at least some of the disconnection switches 502 may be internal to the unconnected loads 210, and at least some of the disconnection switches 502 may be external to the unconnected loads 210. The controller 308 may control the disconnection switches 502 directly or may instruct a corresponding one of the unconnected loads 210 to control the respectively disconnection switches 502. In various examples, fewer than all of the unconnected loads 210 may be coupled to, or include, a disconnection switch.

In some examples, the UPS 206 may be configured to selectively connect or disconnect unconnected loads of the unconnected loads 210 from the circuit breaker 202 by actuating a respective disconnection switch of the disconnection switches 502. The disconnection switches 502 may include relays, or other actuatable switches, configured to be opened and/or closed by the controller 308. The controller 308 may be configured to control respective disconnection switches of the disconnection switches 502 to open, and thereby cause a respective one of the unconnected loads 510 coupled to the respective disconnection switch to draw less current from the circuit breaker 202, to avoid tripping the circuit breaker 202. In some examples, causing at least one of the unconnected loads 510 to draw less current from the circuit breaker 202 includes causing the at least one of the unconnected loads 510 to draw no current from the circuit breaker 202. Accordingly, although an unconnected load coupled to an open disconnection switch may be powered down, the circuit breaker 202 may not be tripped, and the remaining loads may continue to receive electrical power.

In various examples, the controller 308 may be configured to select a disconnection switch to open based on one or more parameters. For example, the controller 308 may open disconnection switches in a hierarchical order based on a stored priority list of the unconnected loads 210. If the circuit-breaker current I_CB approaches a current rating of the circuit breaker 202, the controller 308 may open a disconnection switch of a lowest-priority load of the unconnected loads 210, thereby disconnecting the corresponding load from the circuit breaker 202 and reducing the circuit-breaker current I_CB. If the circuit-breaker current I_CB again approaches the current rating of the circuit breaker 202 while the unconnected load is disconnected, the controller 308 may control a disconnection switch of a second lowest priority load of the unconnected loads 210 to open, and so forth. In some examples, a disconnection switch may not be opened if, for example, the unconnected load coupled to the disconnection switch is not drawing power (for example, because the unconnected load is off or otherwise powered down).

In some examples, the controller 308 may select a disconnection switch to open based on a current draw of a respective unconnected load. For example, the controller 308 may open a disconnection switch corresponding to an unconnected load drawing the most or least current at the time. In some examples, the controller 308 may select a disconnection switch to open based on a combination of a current draw of a respective unconnected load and based on a priority list. For example, a first unconnected load may be a lowest priority load at certain current-draw levels (for example, a current draw of the first unconnected load or of one or more other unconnected loads) but may not be a lowest priority load at other current-draw levels. In still other examples, the controller 308 may select a disconnection switch to open based on additional or different parameters.

Figure 6:
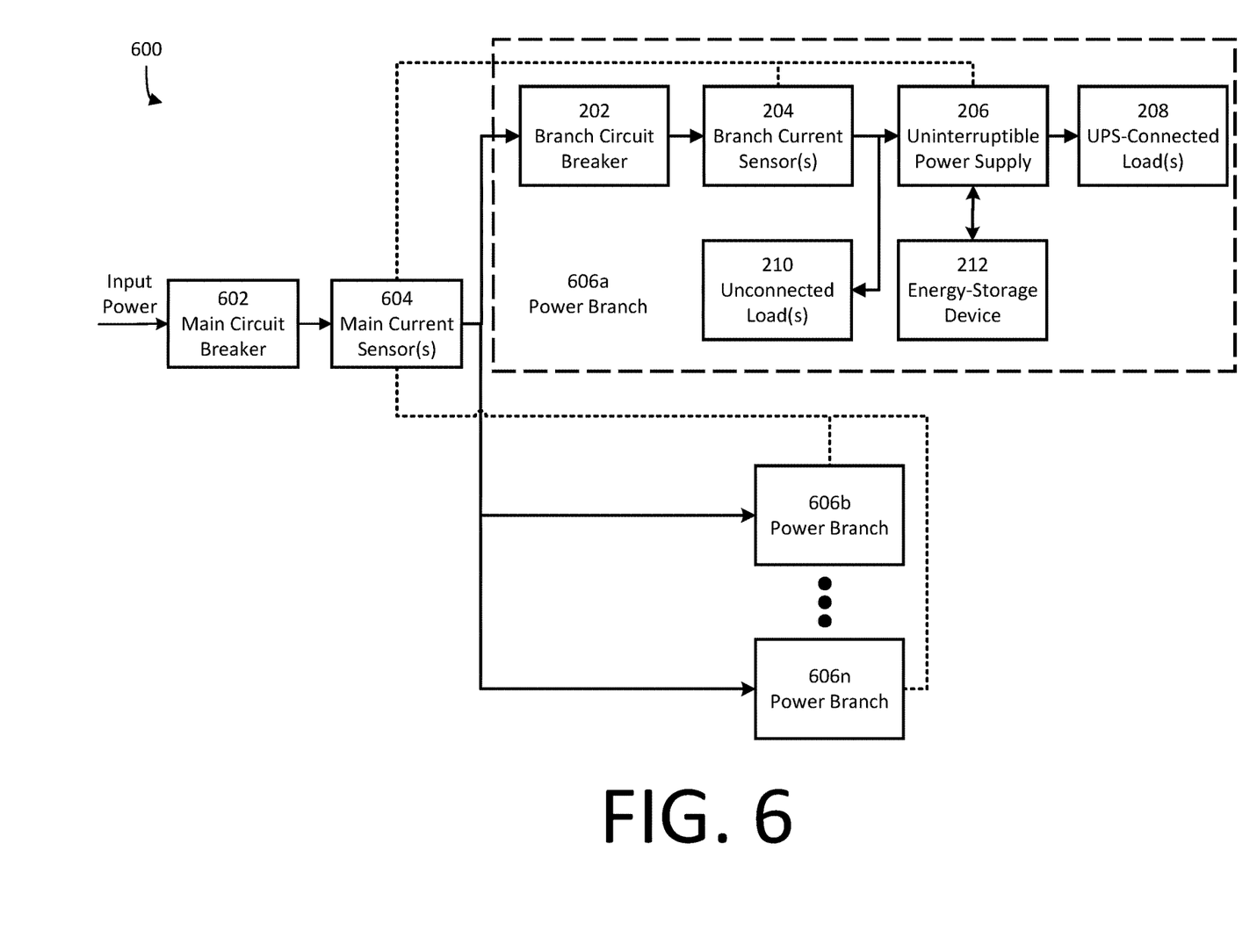
FIG. 6 illustrates a block diagram of a power system according to another example.

In some examples, the UPS 206 may be implemented in a power system having a single circuit breaker. In other examples, the UPS 206 may be implemented in a power system having multiple circuit breakers. For example, FIG. 6 illustrates a multi-breaker system 600 according to an example. The multi-breaker system 600 includes a main circuit breaker 602, one or more main current sensors 604 ("main current sensor 604"), and a plurality of power systems 606. In various examples, each power system of the plurality of power systems 606 may be implemented as power systems discussed above, such as the power systems 200, 500. In other examples, only one power system of the plurality of power systems 606 may be implemented in a similar manner as the power systems 200, 500, and the remaining power systems may not include a UPS, for example.

The main circuit breaker 602 is coupled to the main current sensor 604 at an output, and is configured to be coupled to, and receive input power from, a mains power source at an input. The main current sensor 604 is coupled to the main circuit breaker 602 at an input, and is coupled to the power systems 606 at an output. Each of the power systems 606 is coupled to the main current sensor 604 at an input and is communicatively coupled to the main current sensor 604 (for example, via a respective controller of each of the power systems 606).

For purposes of example, a first power system 606a of the power systems 606 may be an implementation of the power system 200. The UPS 206 of the first power system 606a may operate in the manner discussed above to avoid tripping the branch circuit breaker 202. In addition, the UPS 206 may operate in a similar manner with respect to the main circuit breaker 602 to avoid tripping the main circuit breaker 602. For example, the UPS 206 may determine a main-branch current based on current-sense information received from the main current sensor 604 and modulate a current drawn from the main circuit breaker 602 (for example, by modulating a current drawn from the energy-storage device 212 and/or controlling one or more disconnection switches) to avoid tripping the main circuit breaker 602. In some examples, the first power system 606a may also be communicatively coupled (for example, via the UPS 206) to the remaining power systems 606b, 606n. In at least one example, the first power system 606a may determine a current through at least one component of each of the remaining power systems 606b, 606n, such as a branch circuit breaker thereof, and may modulate a current drawn from the energy-storage device 212 to avoid tripping the other branch circuit breakers in addition to, or in lieu of, avoiding tripping the main circuit breaker 602.

In some examples, each of the power systems 606 may operate in a substantially similar or identical manner to modulate a current through the main circuit breaker 602 and/or branch circuit breakers of other power systems. In other examples, the power systems 606 may operate differently. For example, one of the power systems 606 may be a master power system, and the remaining power systems may be slave power systems. The power systems 606 may be communicatively coupled to one another (for example, at each respective UPS 206) such that a master power system (for example, the first power system 606a) controls the slave power systems. The first power system 606a may control or instruct the other power systems 606b, 606n to modulate an amount of current drawn from the main circuit breaker 602 to avoid tripping the main circuit breaker 602. In some examples, one or more power systems (for example, the first power system 606a) may be communicatively coupled (for example, via a respective UPS 206) to one or more current sensors in the other power systems. In various examples, each of the power systems 606 modulates a current through its respective branch circuit breaker to avoid tripping the branch circuit breakers in addition to avoiding tripping the main circuit breaker 602. In another example, a power system of the power systems 606 may include a master UPS 206 configured to modulate a current through each branch circuit to avoid tripping any individual branch circuit breaker in addition to avoiding tripping the main circuit breaker 602.

In some examples, the power systems 606 may be configured to modulate a current through the main circuit breaker 602 in a hierarchical order. For example, the first power system 606a may be configured to initially reduce or limit a current draw from the main circuit breaker 602 until one or more conditions are met, after which the second power system 606b may be configured to reduce or limit a current draw from the main circuit breaker 602. The one or more conditions may include, for example, a maximum current being drawn from the energy-storage device 212 of the first power system 606a such that the first power system 606a cannot further reduce a current draw without powering down one or more loads.

Additionally or alternatively, one or more of the power systems 606 may selectively disconnect one or more loads in the manner discussed above with respect to FIG. 5 to reduce a current draw on the main circuit breaker 602. For example, at least one of the power branches 606 may be implemented in the configuration discussed above with respect to the power system 500. In one example, the power systems 606 may first reduce or limit a current draw on the main circuit breaker 602 by drawing a maximum backup current from a respective energy-storage device before beginning to disconnect loads. In various examples, loads may be disconnected in priority order. The priority order may be established across all of the power systems in some examples. For example, a lowest priority load may be an unconnected load of the first power system 606a, a second lowest priority load may be an unconnected load of the second power system 606b, and so forth. In various examples, a master UPS (for example, the UPS 206 of the first power system 606a) may control or instruct the remaining UPSs to disconnect the loads in the priority order.

Accordingly, examples discussed herein modulate a current draw through a circuit breaker to avoid tripping the circuit breaker without compromising a current provided to one or more loads downstream from the circuit breaker. In some examples, a current through the circuit breaker may be limited below a current threshold at least in part by drawing at least a portion of an output current from an energy-storage device in lieu of the circuit breaker. In various examples, a current through the circuit breaker may be limited below a current threshold at least in part by selectively disconnecting one or more loads coupled to the circuit breaker such that the disconnected loads do not draw power from the circuit breaker. In some examples, multiple such power systems may be coupled in parallel and to a main circuit breaker. Each power system may reduce or limit a current through a respective branch circuit breaker in addition to reducing or limiting a current through the main circuit breaker.

Although certain examples are illustrated in connection with AC-powered loads, it is to be appreciated that the principles discussed herein are applicable to DC-powered loads. Similarly, although certain examples are illustrated in connection with AC power sources, it is to be appreciated that the principles discussed herein are applicable to DC power sources.

Furthermore, although certain examples illustrate a single UPS configured to modulate a current draw through a circuit breaker, it is to be appreciated that in alternate examples a power system may include multiple UPSs configured to modulate a current through a circuit breaker. Example configurations of components are provided for purposes of example only and are not intended to be limiting. For example, although in some illustrated examples a circuit breaker is coupled upstream from a current sensor, in other examples a circuit breaker may be coupled downstream from a current sensor.

Various controllers, such as the controller 308, may execute various operations discussed above. Using data stored in associated memory and/or storage, the controller 308 also executes one or more instructions stored on one or more non-transitory computer-readable media, which the controller 308 may include and/or be coupled to, that may result in manipulated data. In some examples, the controller 308 may include one or more processors or other types of controllers. In one example, the controller 308 is or includes at least one processor. In another example, the controller 308 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

In various examples, components discussed herein may be housed within respective housings. For example, and with reference to FIG. 3, the UPS 206 may include a housing to house the components 300-308, and the circuit breaker 202, current sensor 204, connected loads 208, unconnected loads 210, and/or energy-storage device 212 may be external to the housing.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. An uninterruptible power supply (UPS) comprising:
an input configured to be coupled to, and receive input power from, a circuit breaker, wherein the circuit breaker is a main circuit breaker configured to provide a first portion of a current through the circuit breaker to the input and a second portion of the current through the circuit breaker to at least one branch circuit breaker;
an output configured to be coupled to, and provide output power to, at least one load;
an energy-storage-device interface configured to be coupled to, and receive back-up power from, an energy-storage device; and
at least one controller configured to
determine whether the current through the circuit breaker meets at least one over-current criterion;
control, responsive to determining that the current through the circuit breaker meets the at least one over-current criterion, the uninterruptible power supply to provide the output power to the at least one load, the output power being derived from the input power and the back-up power;
determine whether a current through the at least one branch circuit breaker meets at least one second over-current criterion; and
control, responsive to determining that the current through the at least one branch circuit breaker meets the at least one second over-current criterion, the uninterruptible power supply to provide the output power to the at least one load, the output power being derived from the input power and the back-up power.

2. The UPS of claim 1, wherein the at least one over-current criterion includes a current threshold, and wherein determining whether the current through the circuit breaker meets the at least one over-current criterion includes determining whether the current through the circuit breaker meets the current threshold.

3. The UPS of claim 2, wherein the current threshold is a current rating of the circuit breaker.

4. The UPS of claim 2, further comprising at least one power converter coupled to the energy-storage-device interface, wherein the at least one controller is further configured to
determine, responsive to determining that the current through the circuit breaker meets or exceeds the current threshold, a current difference between an output current to be provided to the at least one load and an input current drawn from the circuit breaker; and
control the at least one power converter to draw back-up current from the energy-storage-device interface based on the current difference.

5. The UPS of claim 2, further comprising at least one power converter coupled to the circuit breaker and configured to draw an input current from the circuit breaker, wherein the at least one controller is further configured to control the at least one power converter to limit the input current such that the current through the circuit breaker does not exceed the current threshold.

6. The UPS of claim 1, wherein the at least one controller is communicatively coupled to at least one current sensor coupled in series with the circuit breaker, and wherein the at least one controller is configured to receive current information indicative of the current through the circuit breaker from the at least one current sensor.

7. The UPS of claim 1, wherein the UPS is coupled in parallel with one or more loads each coupled to a respective disconnection switch of one or more disconnection switches, and wherein the at least one controller is communicatively coupled to each disconnection switch of the one or more disconnection switches.

8. The UPS of claim 7, wherein the one or more loads includes a first external load coupled to a first disconnection switch, and wherein the at least one controller is configured to control, responsive to determining that the current through the circuit breaker meets the over-current criterion, the first disconnection switch to cause the first external load to draw less current from the circuit breaker.

9. The UPS of claim 7, wherein the one or more loads are ranked from a lowest-priority load to a highest-priority load, and wherein the at least one controller is configured to control, responsive to determining that the current through the circuit breaker meets the over-current criterion, a respective disconnection switch coupled to the lowest-priority load to cause the lowest-priority load to draw less current from the circuit breaker.

10. The UPS of claim 9, wherein the at least one controller is configured to control, responsive to determining that the current through the circuit breaker meets the over-current criterion subsequent to controlling the respective disconnection switch coupled to the lowest-priority load to cause the lowest-priority load to draw less current from the circuit breaker, a respective disconnection switch coupled to a second-lowest-priority load to cause the second-lowest-priority load to draw less current from the circuit breaker.

11. The UPS of claim 1, further comprising at least one power converter coupled to the energy-storage-device interface, wherein the at least one controller is further configured to control, responsive to determining that the current through the circuit breaker does not meet the over-current criterion, the at least one power converter to provide a charging current derived from the input power to the energy-storage device.

12. The UPS of claim 1, further comprising at least one power converter coupled to the energy-storage-device interface, wherein the at least one controller is further configured to control, responsive to determining that the input power is not available from the circuit breaker, the at least one power converter to provide the output power from the energy-storage device to the output.

13. The UPS of claim 1, wherein the at least one controller is further configured to:
determine that the current through the circuit breaker does not meet the at least one over-current criterion;
control the UPS to be in a standby mode of operation responsive to determining that the current through the circuit breaker does not meet the at least one over-current criterion; and
monitor the input power during the standby mode of operation.

14. The UPS of claim 13, wherein the at least one controller is further configured to:
determine, during the standby mode of operation, that the input power is not acceptable;
control the UPS to be in a back-up mode of operation responsive to determining that the input power is not acceptable; and
control the uninterruptible power supply to provide the output power to the at least one load in the back-up mode of operation, the output power being derived from the back-up power.

15. The UPS of claim 14, wherein controlling the uninterruptible power supply to provide output power derived from the back-up power to the at least one load prevents a voltage drop of the output power.

16. The UPS of claim 1, further comprising a housing configured to house the input, the output, the energy-storage-device interface, and the at least one controller, and wherein the circuit breaker is external to the housing.

17. The UPS of claim 1, wherein the at least one second over-current criterion includes a current threshold, and wherein determining whether the current through the branch circuit breaker meets the at least one second over-current criterion includes determining whether the current through the branch circuit breaker meets the current threshold.

18. The UPS of claim 17, wherein the current threshold is a current rating of the branch circuit breaker.

19. A non-transitory computer-readable medium storing thereon sequences of computer-executable instructions for controlling an uninterruptible power supply (UPS) having an input coupled to and configured to receive input power from a circuit breaker, an output coupled to and configured to provide output power to a load, and an energy-storage-device interface coupled to and configured to receive back-up power from an energy-storage device, wherein the circuit breaker is a main circuit breaker configured to provide a first portion of a current through the circuit breaker to the input and a second portion of the current through the circuit breaker to at least one branch circuit breaker, the sequences of computer-executable instructions including instructions that instruct at least one processor to:
  determine whether the current through the circuit breaker meets at least one over-current criterion;
  control, responsive to determining that the current through the circuit breaker meets the at least one over-current criterion, the uninterruptible power supply to provide the output power to the load, the output power being derived from the input power and the back-up power;
  determine whether a current through the at least one branch circuit breaker meets at least one second over-current criterion; and
  control, responsive to determining that the current through the at least one branch circuit breaker meets the at least one second over-current criterion, the uninterruptible power supply to provide the output power to the load, the output power being derived from the input power and the back-up power.

20. The non-transitory computer-readable medium of claim 19, wherein the at least one over-current criterion includes a current threshold, and wherein determining whether the current through the circuit breaker meets the at least one over-current criterion includes determining whether the current through the circuit breaker meets the current threshold.

21. The non-transitory computer-readable medium of claim 20, wherein the UPS further includes at least one power converter coupled to the energy-storage-device interface, and wherein the instructions further instruct the at least one processor to:
  determine, responsive to determining that the current through the circuit breaker meets or exceeds the current threshold, a current difference between an output current to be provided to the load and an input current drawn from the circuit breaker; and
  control the at least one power converter to draw back-up current from the energy-storage-device interface based on the current difference.

22. The non-transitory computer-readable medium of claim 20, wherein the UPS further includes at least one power converter coupled to the circuit breaker and configured to draw an input current from the circuit breaker, and wherein the instructions further instruct the at least one processor to control the at least one power converter to limit the input current such that the current through the circuit breaker does not exceed the current threshold.

23. The non-transitory computer-readable medium of claim 20, wherein the current threshold is a current rating of the circuit breaker.

24. The non-transitory computer-readable medium of claim 19, wherein the UPS is coupled in parallel with one or more loads including a first external load coupled to a first disconnection switch, and wherein the instructions further instruct the at least one processor to control, responsive to determining that the current through the circuit breaker meets the over-current criterion, the first disconnection switch to cause the first external load to draw less current from the circuit breaker.

25. The non-transitory computer-readable medium of claim 24, wherein the one or more loads are ranked from a lowest-priority load to a highest-priority load, and wherein the instructions further instruct the at least one processor to control, responsive to determining that the current through the circuit breaker meets the over-current criterion, a respective disconnection switch coupled to the lowest-priority load to cause the lowest-priority load to draw less current from the circuit breaker.

26. The non-transitory computer-readable medium of claim 19, wherein the instructions further instruct the at least one processor to:
  determine that the current through the circuit breaker does not meet the at least one over-current criterion;
  control the UPS to be in a standby mode of operation responsive to determining that the current through the circuit breaker does not meet the at least one over-current criterion; and
  monitor the input power during the standby mode of operation.

27. The non-transitory computer-readable medium of claim 26, wherein the instructions further instruct the at least one processor to:
  determine, during the standby mode of operation, that the input power is not acceptable;
  control the UPS to be in a back-up mode of operation responsive to determining that the input power is not acceptable; and
  control the uninterruptible power supply to provide the output power to the load in the back-up mode of operation, the output power being derived from the back-up power.

28. The non-transitory computer-readable medium of claim 27, wherein controlling the uninterruptible power supply to provide output power derived from the back-up power to the load prevents a voltage drop of the output power.

29. The non-transitory computer-readable medium of claim 19, wherein the at least one second over-current criterion includes a current threshold, and wherein determining whether the current through the branch circuit breaker meets the at least one second over-current criterion includes determining whether the current through the branch circuit breaker meets the current threshold.

30. The non-transitory computer-readable medium of claim 29, wherein the current threshold is a current rating of the branch circuit breaker.

31. A method for controlling an uninterruptible power supply (UPS) having an input coupled to and configured to receive input power from a circuit breaker, an output coupled to and configured to provide output power to a load, and an energy-storage-device interface coupled to and configured to receive back-up power from an energy-storage device, wherein the circuit breaker is a main circuit breaker configured to provide a first portion of a current through the circuit breaker to the input and a second portion of the current through the circuit breaker to at least one branch circuit breaker, the method comprising:

- determining whether the current through the circuit breaker meets at least one over-current criterion;
- controlling, responsive to determining that the current through the circuit breaker meets the at least one over-current criterion, the uninterruptible power supply to provide the output power to the load, the output power being derived from the input power and the back-up power;
- determining whether a current through the at least one branch circuit breaker meets at least one second over-current criterion; and
- controlling, responsive to determining that the current through the at least one branch circuit breaker meets the at least one second over-current criterion, the uninterruptible power supply to provide the output power to the load, the output power being derived from the input power and the back-up power.

* * * * *